United States Patent
Croak et al.

(10) Patent No.: US 7,664,033 B1
(45) Date of Patent: Feb. 16, 2010

(54) METHOD AND APPARATUS FOR AUTOMATING THE DETECTION AND CLEARANCE OF CONGESTION IN A COMMUNICATION NETWORK

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 852 days.

(21) Appl. No.: 11/240,897

(22) Filed: Sep. 30, 2005

(51) Int. Cl.
*H04L 12/56* (2006.01)

(52) U.S. Cl. ...................................... 370/235

(58) Field of Classification Search ........................ None
See application file for complete search history.

(56) References Cited

U.S. PATENT DOCUMENTS

| | | | |
|---|---|---|---|
| 6,212,164 B1 * | 4/2001 | Murakami et al. | 370/230 |
| 6,532,214 B1 * | 3/2003 | Rumsewicz | 370/236 |
| 6,614,756 B1 * | 9/2003 | Morgenstern et al. | 370/230 |
| 6,650,619 B1 * | 11/2003 | Schuster et al. | 370/230 |
| 6,747,953 B1 * | 6/2004 | Qureshi et al. | 370/235 |
| 7,301,910 B2 * | 11/2007 | Freedman | 370/252 |
| 2006/0187841 A1 * | 8/2006 | Palmer | 370/236 |
| 2007/0070989 A1 * | 3/2007 | Savoor et al. | 370/356 |

\* cited by examiner

*Primary Examiner*—Anh-Vu Ly

(57) ABSTRACT

A method and apparatus for enabling a network to determine the call volume rate versus the call blocking rate on a predefined time interval basis over multiple predefined time intervals are disclosed. For example, if call blocking rates do not show a progressive trend of decline as call volume rates decline over multiple predefined time intervals, an alarm can be generated and corrective actions to flush out congested signaling message queues can be initiated to return the network to normal operating conditions.

15 Claims, 4 Drawing Sheets

METHOD AND APPARATUS FOR AUTOMATING THE DETECTION AND CLEARANCE OF CONGESTION IN A COMMUNICATION NETWORK

The present invention relates generally to communication networks and, more particularly, to a method and apparatus for automating the detection and clearance of congestion in communication networks, e.g., packet networks such as Voice over Internet Protocol (VoIP) networks.

BACKGROUND OF THE INVENTION

Service disruptions in a packet network, e.g., a VoIP network can occur as a result of mass calling events that produce overloads and subsequent queuing congestion of signaling messages that result in call blocking due to call set up signaling message processing delays. If the call volumes quickly subside then the network typically recovers and will soon begin processing calls at a normal rate. However, if the call volumes decline and return to normal but the corresponding call blocking rate continues to increase or even remain flat, then the network is suffering a congestion problem that requires corrective actions to be taken to flush out the congested signaling message queues before calls can be handled normally after the call volume rate returns to normal.

Therefore, a need exists for a method and apparatus for automating the detection and clearance of congestion in a packet network, e.g., a VoIP network.

SUMMARY OF THE INVENTION

In one embodiment, the present invention enables a network to determine the call volume rate versus the call blocking rate on a predefined time interval basis over multiple of said predefined time intervals. If call blocking rates do not show a progressive trend of decline as call volume rates decline over multiple predefined time intervals, an alarm can be generated and corrective actions to flush out congested signaling message queues can be initiated to return the network to normal operating conditions.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
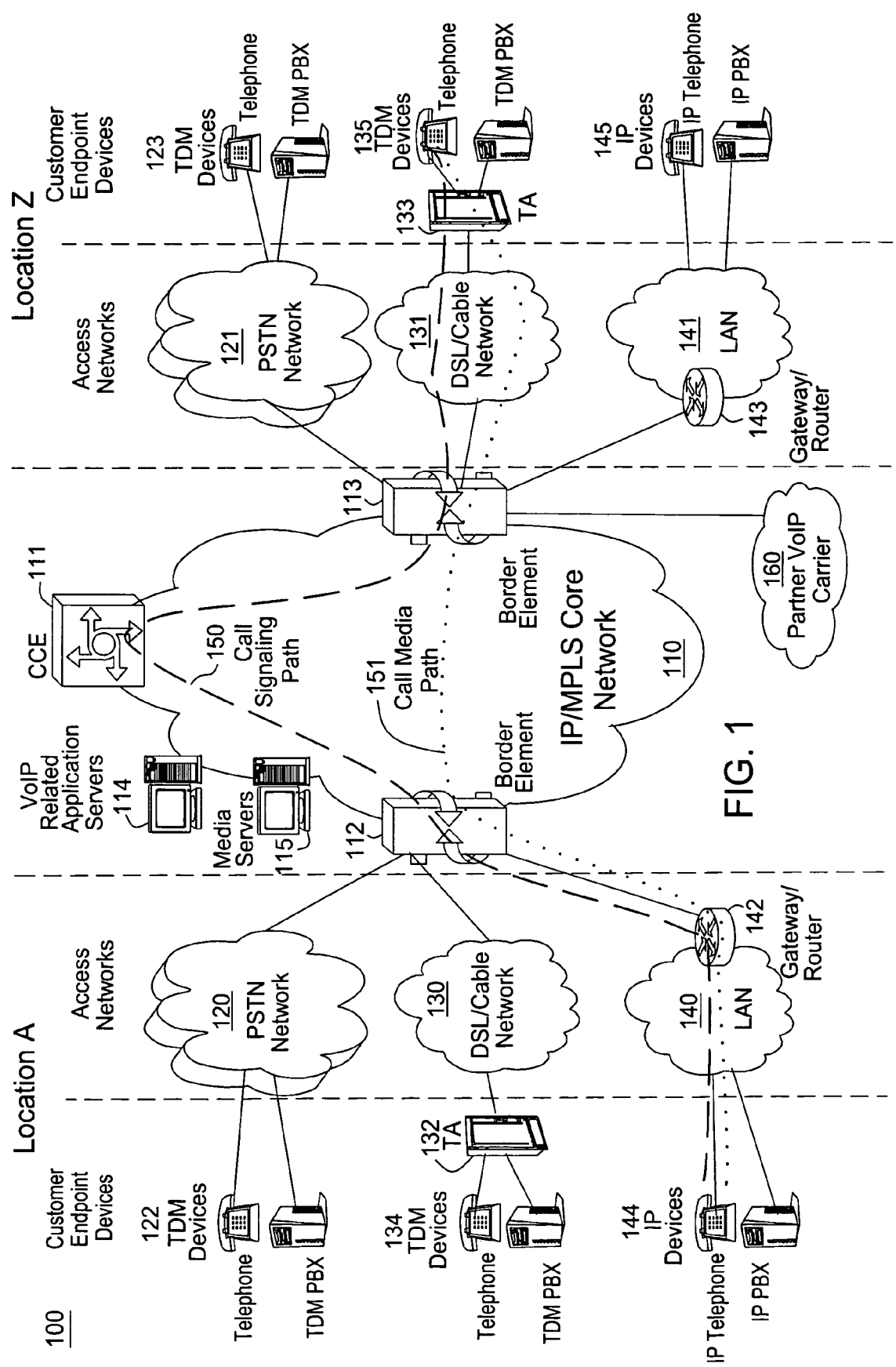
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Service disruptions in a packet network, e.g., a VoIP network can occur as a result of mass calling events that produce overloads and subsequent queuing congestion of signaling messages that result in call blocking due to call set up signaling message processing delays. If the call volumes quickly subside then the network typically recovers and will soon begin processing calls at a normal rate. However, if the call volumes decline and return to normal but the corresponding call blocking rate continues to increase or even remain flat, then the network is suffering a congestion problem that requires corrective actions to be taken to flush out the congested signaling message queues before calls can be handled normally after the call volume rate returns to normal.

To address this need, the present invention enables a network to determine the call volume rate versus the call blocking rate on a predefined time interval basis over multiple of said predefined time intervals. If call blocking rates do not show a progressive trend of decline as call volume rates decline over multiple predefined time intervals, an alarm can be generated and corrective actions to flush out congested signaling message queues can be initiated to return the network to normal operating conditions.

Figure 2:
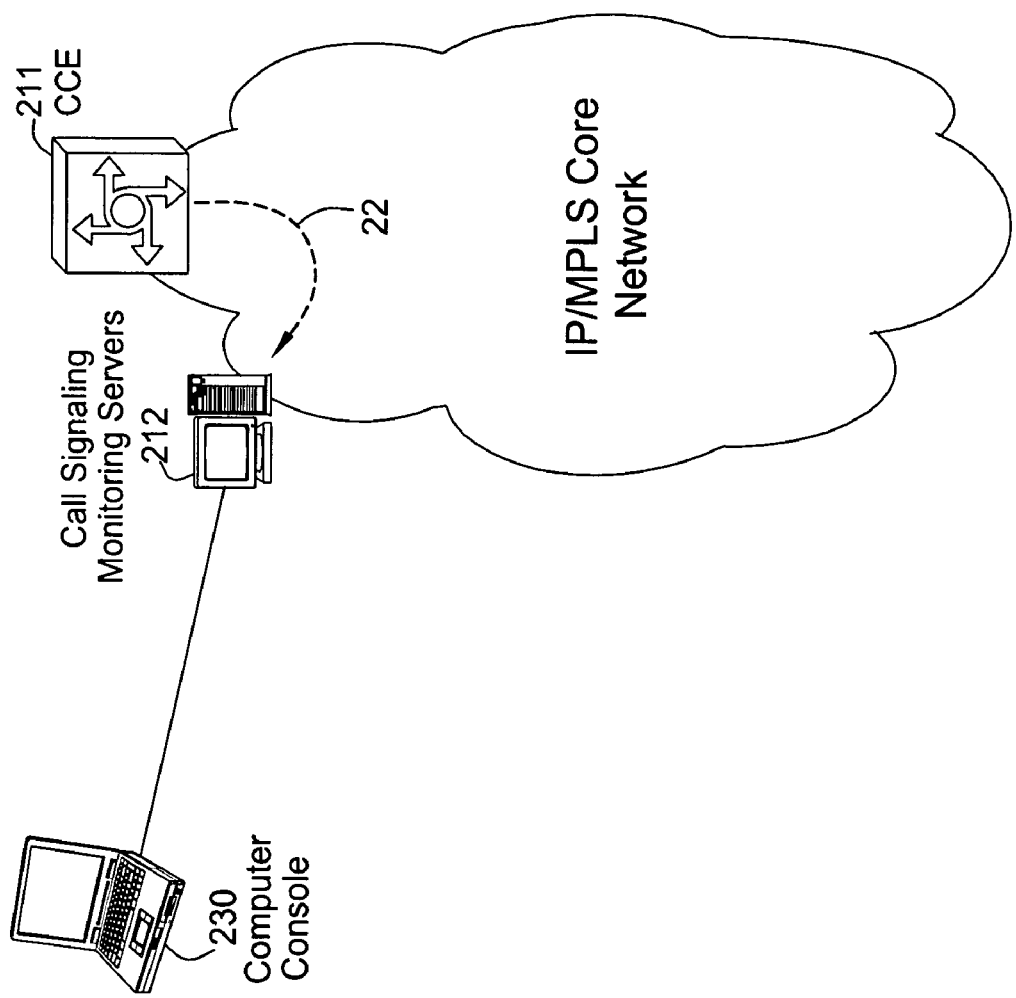
FIG. 2 illustrates an example of automating the detection and clearance of congestion in a packet network of the present invention.

FIG. 2 illustrates an exemplary communication architecture 200 for automating the detection and clearance of congestion in a packet network, e.g., a VoIP network of the present invention. In FIG. 2, CCE 211 is responsible for call setup processing for the VoIP network; therefore, CCE 211 keeps track of the call volumes and the call blocking volumes. Call volumes represent the number of call setup signaling messages received by CCE 211 and call blocking volumes represent the number of call setup signaling messages that are blocked and cannot be successfully completed. The call volumes and call blocking volumes information are sent to call signaling monitoring server 212 using collection flow 220 for further processing. Call signaling monitoring server 212 uses the collected call volumes and call blocking volumes to derive the call volume rate and the call blocking rate over consecutive predefined time intervals. The length of the predefined time interval is a configurable parameter set by the network operator.

By observing the changes of call volume rate and call blocking rate over multiple predefined time intervals, the corresponding trends of the call volume rate and the call blocking rate over time can be observed. If the observed call volume rate exhibits a sudden increase and then declines over time but the corresponding observed call blocking rate continue to increase or remains flat over time, then the network may be suffering a call signaling congestion problem. If such a congestion condition is detected, then an alarm can be sent to the network operator to warn the operator of a signaling queue congestion problem within the network. In fact, corrective actions such as resetting signaling message queues within call signaling network elements, resetting signaling processor within call signaling network elements, and performing failover from active signaling processor to standby signaling processor within call signaling network elements, can also be carried out to relieve the congestion problem within the network.

In one embodiment, the historical call volume rate and call blocking rate figures from multiple time intervals can be displayed on a computer console 230 to be studied by a network engineer. In another embodiment, the historical call volume rate and call blocking rate figures from multiple time intervals can be plotted as graphical presentation on a computer console to be studied by network engineers.

Figure 3:
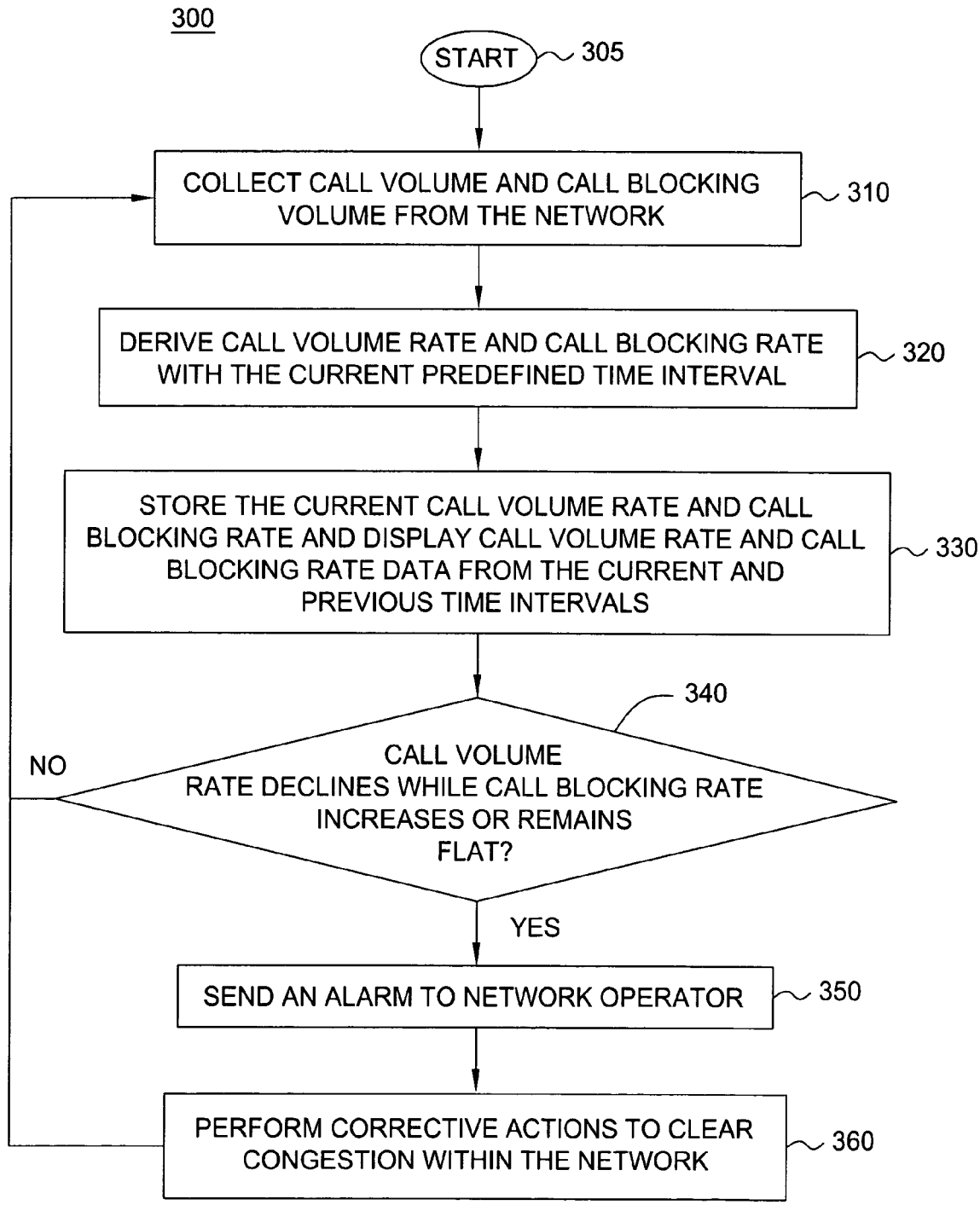
FIG. 3 illustrates a flowchart of a method for automating the detection and clearance of congestion in a packet network of the present invention.

FIG. 3 illustrates a flowchart of a method 300 for automating the detection and clearance of congestion in a packet network, e.g., a VoIP network of the present invention. Method 300 starts in step 305 and proceeds to step 310.

In step 310, the method collects call volumes and call blocking volumes from the VoIP network. For example, a CCE may collect the call volumes and call blocking volumes.

In step 320, the method uses the collected call volumes and the call blocking volumes to derive the corresponding call volume rate and call blocking over the current predefined time interval. The call volume rate is derived by dividing the collected call volumes in the current predefined time interval over the length of the predefined time interval. The call blocking rate is derived by dividing the collected call blocking volumes in the current predefined time interval over the length of the predefined time interval. The length of the predefined time interval is a configurable parameter set by the network operator.

In step 330, the method stores the derived call volume rates and call blocking rates. The method may also display on a computer console the derived call volume rates and call blocking rates from the current and previous predefined time intervals to be studied by network engineers. In one embodiment, the historical call volume rate and call blocking rate figures from multiple time intervals can be displayed on a computer console to be studied by a network engineer. In another embodiment, the historical call volume rate and call blocking rate figures from multiple time intervals can be plotted as graphical presentation on a computer console to be studied by network engineers.

In step 340, the method checks if the derived call volume rates, after experiencing a sudden surge in call volumes, decline over time while the corresponding derived call blocking rates continue to increase or remain flat over time. If the derived call volume rates, after experiencing a sudden surge in call volumes, decline over time while the corresponding derived call blocking rates continue to increase or remain flat over time, the method proceeds to step 350; otherwise, the method proceeds back to step 310.

In step 350, the method sends an alarm to warn the network operator of a potential signaling congestion problem within the network.

In step 360, the method performs one or more corrective actions to relieve the signaling congestion problem within the network. Corrective actions that can be taken include but are not limited to: resetting signaling message queues in call signaling network elements, resetting signaling processor within call signaling network elements, and/or performing failover from active signaling processor to standby signaling processor within call signaling network elements. It should be noted that the call signaling network element comprises at least one of: a Call Control Element (CCE) and/or a Border Element (BE). Then the method proceeds back to step 310.

Figure 4:
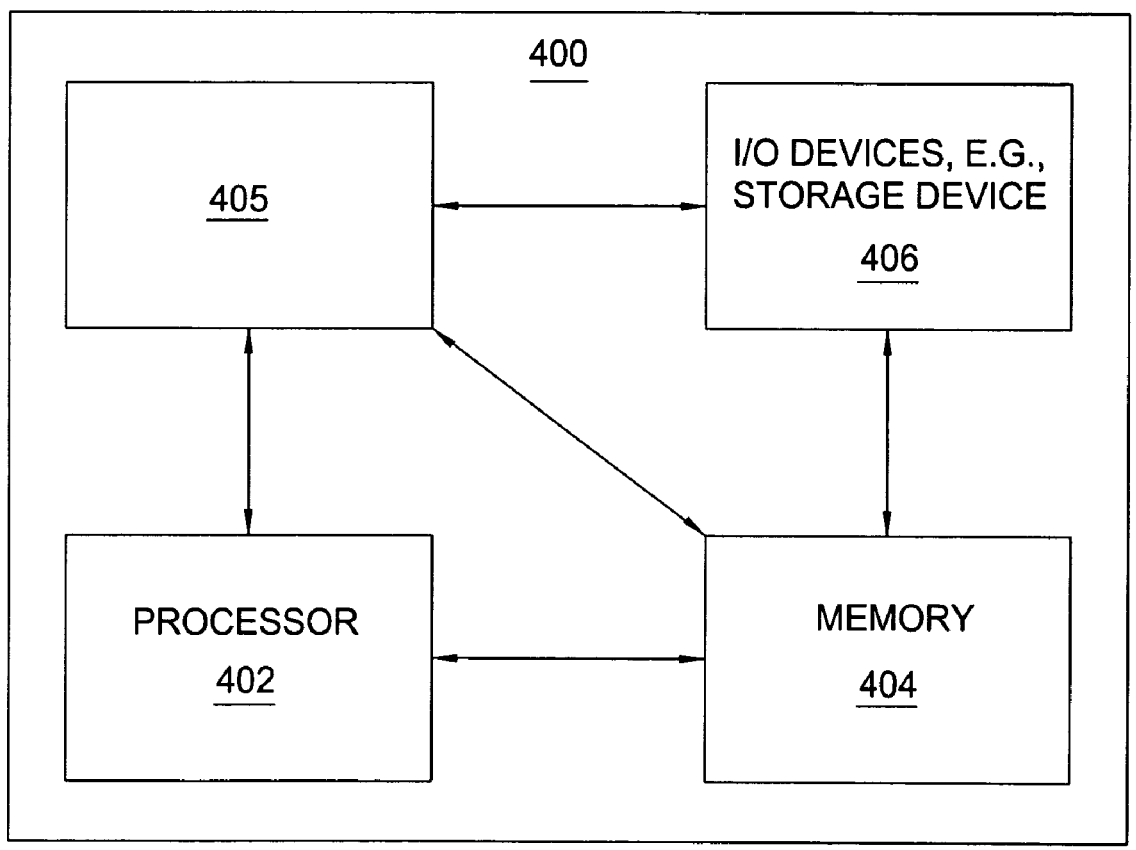
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for automating the detection and clearance of congestion, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for automating the detection and clearance of congestion can be loaded into memory 404 and executed by processor 402 to implement the functions as discussed above. As such, the present process 405 for automating the detection and clearance of congestion (including associated data structures) of the present invention can be stored on a computer readable medium e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a congestion in a communication network, comprising:
    collecting call volumes and call blocking volumes within said communication network, wherein said call volumes and said call blocking volumes are collected by a Call Control Element (CCE);
    deriving a call volume rate and a call blocking rate for a plurality of predefined time intervals;
    detecting a call signaling congestion within said communication network using said call volume rate and said call blocking rate over said plurality of predefined time intervals; and
    wherein said detecting further comprises comparing said call volume rate and said call blocking rate over said plurality of predefined time intervals after a sudden surge in call volumes has subsided; and
    identifying said call signaling congestion if said call blocking rate continues to increase or remains flat after said call volume rate declines and returns to a normal condition.

2. The method of claim 1, wherein said communication network is a Voice over Internet Protocol (VoIP) network or a Service over Internet Protocol (SoIP) network.

3. The method of claim 1, further comprising:
    displaying said call volume rate and said call blocking rate over said plurality of predefined time intervals in a graphical format.

4. The method of claim 1, further comprising:
    sending an alarm to an operator of said communication network.

5. The method of claim 1, further comprising:
    performing at least one corrective action automatically to return said communication network to a normal operating condition.

6. The method of claim 5, wherein said at least one corrective action comprises:
    resetting a signaling message queue in at least one call signaling network element;
    resetting a signaling processor within at least one of said at least one call signaling network element; or
    performing a failover from an active signaling processor to a standby signaling processor within said at least one call signaling network element.

7. The method of claim 6, wherein said at least one call signaling network element comprises at least one of: a Call Control Element (CCE) or a Border Element (BE).

8. A computer-readable storage medium having stored thereon a plurality of computer executable instructions, the plurality of computer executable instructions including instructions which, when executed by a computer, cause the computer to perform steps of a method for detecting a congestion in a communication network, comprising:
    collecting call volumes and call blocking volumes within said communication network, wherein said call volumes and said call blocking volumes are collected by a Call Control Element (CCE);
    deriving a call volume rate and a call blocking rate for a plurality of predefined time intervals;

detecting a call signaling congestion within said communication network using said call volume rate and said call blocking rate over said plurality of predefined time intervals; and wherein said detecting further comprises comparing said call volume rate and said call blocking rate over said plurality of predefined time intervals after a sudden surge in call volumes has subsided; and identifying said call signaling congestion if said call blocking rate continues to increase or remains flat after said call volume rate declines and returns to a normal condition.

9. The computer-readable storage medium of claim 8, wherein said communication network is a Voice over Internet Protocol (VoIP) network or a Service over Internet Protocol (SoIP) network.

10. The computer-readable storage medium of claim 8, further comprising:

displaying said call volume rate and said call blocking rate over said plurality of predefined time intervals in a graphical format.

11. The computer-readable storage medium of claim 8, further comprising:

sending an alarm to an operator of said communication network.

12. The computer-readable storage medium of claim 8, further comprising:

performing at least one corrective action automatically to return said communication network to a normal operating condition.

13. The computer-readable storage medium of claim 12, wherein said at least one corrective action comprises:

resetting a signaling message queue in at least one call signaling network element;

resetting a signaling processor within at least one of said at least one call signaling network element; or performing a failover from an active signaling processor to a standby signaling processor within said at least one call signaling network element.

14. The computer-readable storage medium of claim 13, wherein said at least one call signaling network element comprises at least one of: a Call Control Element (CCE) or a Border Element (BE).

15. An apparatus for detecting a congestion in a communication network, comprising:

means for collecting call volumes and call blocking volumes within said communication network;

means for deriving a call volume rate and a call blocking rate for a plurality of predefined time intervals;

means for detecting a call signaling congestion within said communication network using said call volume rate and said call blocking rate over said plurality of predefined time intervals; and wherein said means for detecting further comprises means for comparing said call volume rate and said call blocking rate over said plurality of predefined time intervals after a sudden surge in call volumes has subsided; and means for identifying said call signaling congestion if said call blocking rate continues to increase or remains flat after said call volume rate declines and returns to a normal condition.

* * * * *